(No Model.)
M. T. CHAPMAN.
EXPANSION DRILL.
No. 410,311. Patented Sept. 3, 1889.
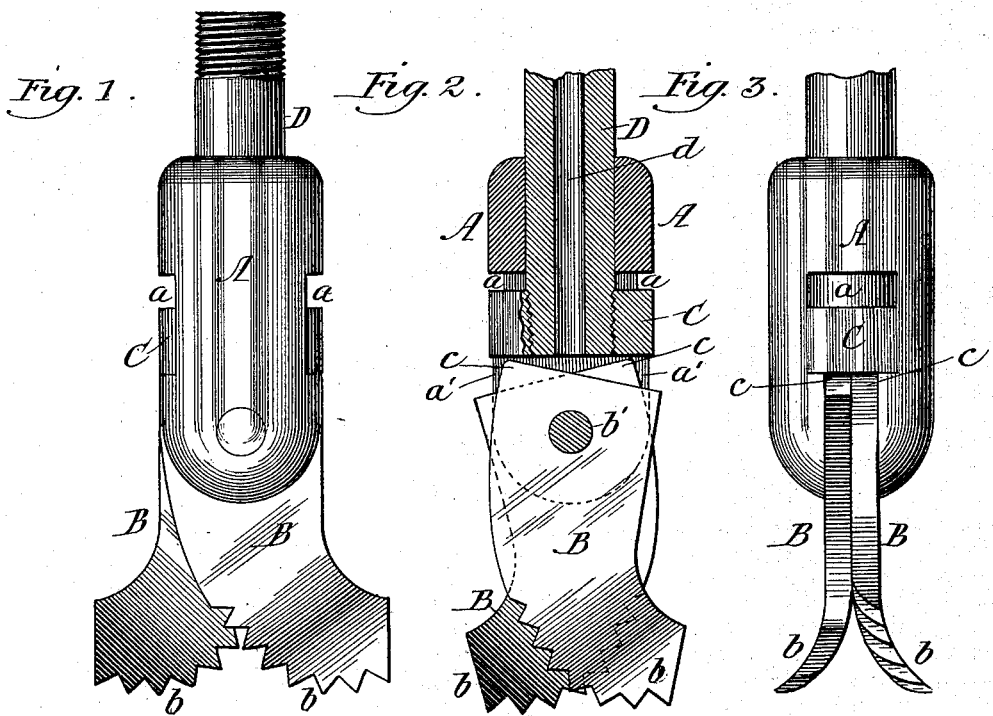
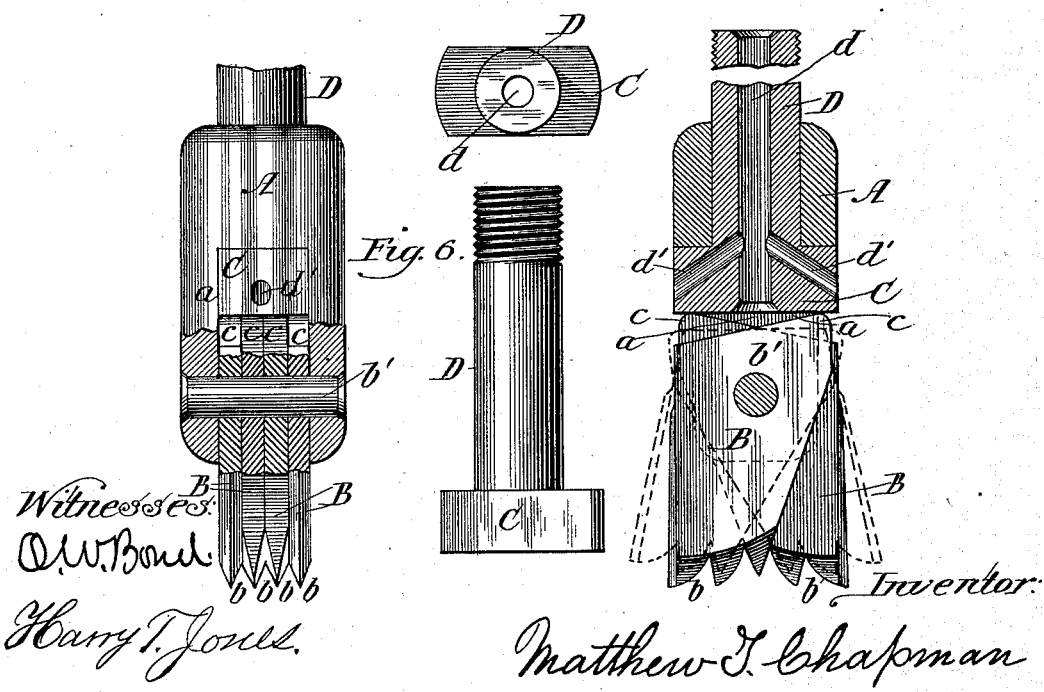
Witnesses:
O. W. Bond
Harry T. Jones
Inventor:
Matthew T. Chapman

UNITED STATES PATENT OFFICE.

MATTHEW T. CHAPMAN, OF AURORA, ILLINOIS.

EXPANSION-DRILL.

SPECIFICATION forming part of Letters Patent No. 410,311, dated September 3, 1889.

Application filed July 11, 1887. Serial No. 244,201. (No model.)

*To all whom it may concern:*

Be it known that I, MATTHEW T. CHAPMAN, residing at Aurora, in the county of Kane and State of Illinois, and a citizen of the United States, have invented a new and useful Improvement in Expansion-Drills, of which the following is a specification, reference being had to the accompanying drawings, in which—

Figure 1 is an elevation showing the blades or bits open; Fig. 2, a sectional elevation showing the blades or bits closed; Fig. 3, an elevation showing an edge view of the blades or bits; Fig. 4, an elevation, partly in section, showing means for discharging the water to wash away the cuttings; Fig. 5, a top view of the driving-head and connecting-pipe; Fig. 6, a side elevation of the same; Fig. 7, a sectional elevation showing the discharge for the water.

This invention relates to that class of drills in which the blades or bits are made expansible for the purpose of being passed through the casing and then thrown out to cut an opening of sufficient diameter for the casing to pass down, and has for its objects to utilize the weight of the drill-rod in opening the blades or bits and have the act of raising the rod close the blades or bits, and to improve generally the construction and operation of this class of drills; and its nature consists in the parts and combination of parts hereinafter described, and pointed out in the claim as new.

In the drawings, A represents a coupling or head made of any suitable material, and of a diameter and length for the size of blades or bits with which it is used. As shown in Fig. 1, this head at its upper end has a circular hole, and midway of its length are lateral openings $a$, and at its lower end are ears $a'$, between which is a slot or opening for the blades or bits.

B are the blades or bits, each formed of a plate of steel or other suitable material, and having, as shown, a cutting-edge $b$, provided with teeth, and the cutting-edge, as shown in Figs. 1, 2, and 3, is of a circular shape, with an outward turn or curve. The blades or bits are secured pivotally in the slot between the ears $a'$ by a pin or pivot $b'$, as shown in Figs. 1 and 2, and the upper end of each blade or bit is formed inclined, so as to leave a corner $c$, which, when the blades or bits are folded or closed, stand above the plane of the other corner, as shown in Fig. 2, so that when struck the blades or bits will be thrown out, as shown in Fig. 1.

C is a head of a width to fit within the lateral openings $a$, and of a length to correspond to the diameter of the body of the coupling or head A and having a less depth than the depth of the lateral openings, so that the head has a free vertical play or movement within the opening $a$, and this head is arranged to strike the corners $c$ of the blades or bits and force them open when the head is down, as shown in Figs. 1 and 3, and when the head is raised, as shown in Fig. 2, the blades or bits are free to fold or close up.

D is an extension of the head C, of a tubular form in cross-section, corresponding in diameter to the diameter of the hole in A, through which it passes, and this projection is provided with an external screw-thread for the attachment of the drill-rod, and, as shown, the tubular extension D and the head C are provided with a hole $d$, which hole, as shown in Fig. 2, is straight, and through which hole water is discharged to wash away the cuttings and leave the blades or bits clear. The head C and tube D can be made of separate pieces screw-threaded together, as shown in Fig. 2, or they can be made of a single piece, as shown in Fig. 7, and when made of a single piece the side openings $a$ are carried down and form the slot for the reception of the blades or bits, as shown in Fig. 4. As shown in Fig. 7, the hole $d$ extends through the tube D and head C, as in Fig. 2, but in addition thereto branch holes $d'$ are provided on each side running to the end of the head C, through which branch holes water is discharged to wash away the cuttings. The arrangement shown in Figs. 4 and 7 permits the employment of four blades or bits instead of two, as in Figs. 1, 2, and 3, but in both cases the blades have the projecting point or end $c$, in contact with which the head C comes to force out or expand the blades or bits, and the position of the blades or bits when expanded is shown by the dotted lines in Fig. 7. The blades or bits of Figs. 4 and 7 are left straight at their acting end, instead of having an outward curve, as in Fig. 3, and the acting end is formed on a different circle than in Figs. 1 and 2, and the form of teeth is varied slightly.

The parts, with the construction shown in Figs. 1, 2, and 3, are assembled by placing the blades or bits B in the slot therefor between the ears $a'$ and securing them in place by a pivot or pin $b'$. The head C is slipped into the side openings $a$ and the tube D screwed therein, and the drill-rod is attached by screwing it onto the projecting end of the tube D.

The parts, in the form of construction shown in Figs. 4 and 7, are assembled by slipping the tube D through the hole in the coupling A, bringing the head C into the side openings $a$, and then placing the blades or bits between the ears $a'$ and securing them in place by a pivot or pin $b'$.

The operation of the drill is as follows: The raising of the drill-rod raises with it the tube D and head C independent of the coupling A until the limit of the side openings $a$ is reached, when the coupling and blades or bits are likewise raised, and the descent of the drill-rod carries down with it the head C and tube D, bringing the head in contact with the ends $c$ with the full force of the weight of the drill, which opens the blades or bits to their full capacity, and at the same time the weight of the drill-rod will hold the blades or bits down to their work at the bottom of the hole being made; and it will be seen that by the additional weight of the drill-rod a greater expansion of the blades or bits is had than with the ordinary drill, and this expansion will be more positive and reliable, as the entire weight of the drill-rod is brought squarely upon the ends of the blades or bits. At the same time that the blades or bits are forced apart or expanded by the action of the drill-rod and head C a stream of water is being discharged, which acts on the cuttings and washes them away, leaving a clear path for the working of the drill. The drill-rod is not shown, as it can be of the usual construction of hollow drill-rods used in sinking wells.

The curved form of blade of Figs. 1 and 3 is designed for use with a drill stock or rod that is rotated, and the form of blade or bit of Figs. 4 and 7 is designed for use with a drill stock or rod which is simply dropped without rotation, and the form of the blades or bits can be varied from those shown, so far as their cutting-edge is concerned, as long as they have the contact end which can be struck to expand the blades or bits, and instead of having the outlet for the water extend through the head C such outlet can be in the tube D or the lower end of the drill-rod, as shown by dotted lines in Fig. 2, and in such case, if desired, the head could be slotted.

What I claim as new, and desire to secure by Letters Patent, is—

A drill-tube D, provided with a head C, in combination with a coupling A, slotted to receive the head C and loosely mounted on the tube D, and blades B, pivoted in the coupling A and having inclined upper ends, whereby the blades are expanded by the weight of the drill rod or tube, substantially as specified.

MATTHEW T. CHAPMAN.

Witnesses:
   ALBERT H. ADAMS,
   HARRY T. JONES.